(12) United States Patent
Zean et al.

(10) Patent No.: US 8,574,043 B2
(45) Date of Patent: Nov. 5, 2013

(54) MULTIFUNCTIONAL FOOD PREPARATION APPARATUS

(76) Inventors: Samuel G. Zean, Brooklyn Park, MN (US); Eunice K. Ndorleh Zean, Brooklyn Park, MN (US)

(*) Notice: Subject to any disclaimer, the term of this patent is extended or adjusted under 35 U.S.C. 154(b) by 0 days.

(21) Appl. No.: 13/412,809

(22) Filed: Mar. 6, 2012

(65) Prior Publication Data
US 2012/0231717 A1 Sep. 13, 2012

Related U.S. Application Data

(60) Provisional application No. 61/464,649, filed on Mar. 7, 2011.

(51) Int. Cl.
*A22C 9/00* (2006.01)

(52) U.S. Cl.
USPC .......................................................... 452/144

(58) Field of Classification Search
USPC ................................................. 452/141–144
See application file for complete search history.

(56) References Cited

U.S. PATENT DOCUMENTS

| | | | | | |
|---|---|---|---|---|---|
| 3,577,585 | A | * | 5/1971 | Allinquant | 452/141 |
| 3,736,859 | A | * | 6/1973 | Carlson | 99/331 |
| 4,628,897 | A | * | 12/1986 | Stanfa et al. | 126/41 R |
| 5,035,672 | A | * | 7/1991 | Rocha et al. | 452/141 |
| 5,393,261 | A | * | 2/1995 | Winton | 452/144 |
| 6,869,351 | B1 | * | 3/2005 | Kell | 452/143 |
| 6,908,375 | B1 | * | 6/2005 | Kadhim | 452/144 |

* cited by examiner

*Primary Examiner* — Richard Price, Jr.
(74) *Attorney, Agent, or Firm* — Vidas, Arrett & Steinkraus, P.A.

(57) ABSTRACT

A food processing apparatus including a lower support structure that carries either a food slicing plate or a meat tenderizing plate, an upper structure that carries either a food plunger plate or a meat tenderizing plate; said lower and upper structures being connected with a floating hinge and including a handle such that a user may pull the two structures together such that their respective plates either tenderize or slice food depending on the plates positioned thereto.

7 Claims, 7 Drawing Sheets

MULTIFUNCTIONAL FOOD PREPARATION APPARATUS

CROSS-REFERENCE TO RELATED APPLICATIONS

U.S. Provisional Patent Application No. 61/464,649 filed Mar. 7, 2011, the disclosure of which is incorporated herein by reference.

STATEMENT REGARDING FEDERALLY SPONSORED RESEARCH OR DEVELOPMENT

Not Applicable.

BACKGROUND OF THE INVENTION

This invention relates to a food processing device that can tenderize food such as meat and may also be used to slice food.

Meat tenderizers have often required a modified hammer that is used repeatedly to strike meat that is to be tenderized. A cutting board and sturdy countertop are required and it can be quite messy. Larger meat tenderizers are possible, but as dedicated units may take up too much valuable counter space to be readily accepted.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

The invention provides a multi-functional food preparation apparatus that may be used to tenderize foods, such as meat, and may also be used to slice food such as potatoes and tomatoes. The apparatus tenderizes and marinate meat and designed to eliminate the need and use of all conventional meat pounding hammers and the many other tools people are accustom to use when attempting to tenderize meat, poultry and fish products and at the same time a veggie slicer that slices everything to slicing bulk vegetables and fruits simultaneously.

The apparatus gives the user a new and simple option to tenderize meat by only opening the floating hinge of the unit, put your meat on the spike plate, then close and press the floating hinge once which then lower the top spike plate on the lower spike plate which holds the meat once for an achieved result. To slice vegetables, a user will change or remove the upper and lower presses and put on a slicer and plunger into the unit, then close the floating hinge to slice bulk vegetables in an instant.

The apparatus is plastic and/or cast iron, with a floating hinge for pressing. It has a "bar" handle across the top, a pull-out cutting board or drawer at the bottom for holding chop produce. It uses two tenderizing plates, one with larger peaks or pyramid spikes on the top plate and small peaks or pyramid spikes on the bottom plate.

The apparatus also may have slicing plates—and features the world's first and only W shape slicer blades for slicing and chopping vegetables.

BRIEF DESCRIPTION OF THE DRAWINGS

A detailed description of the invention is hereafter described with specific reference being made to the drawings in which.

DETAILED DESCRIPTION OF THE INVENTION

Figure 1:
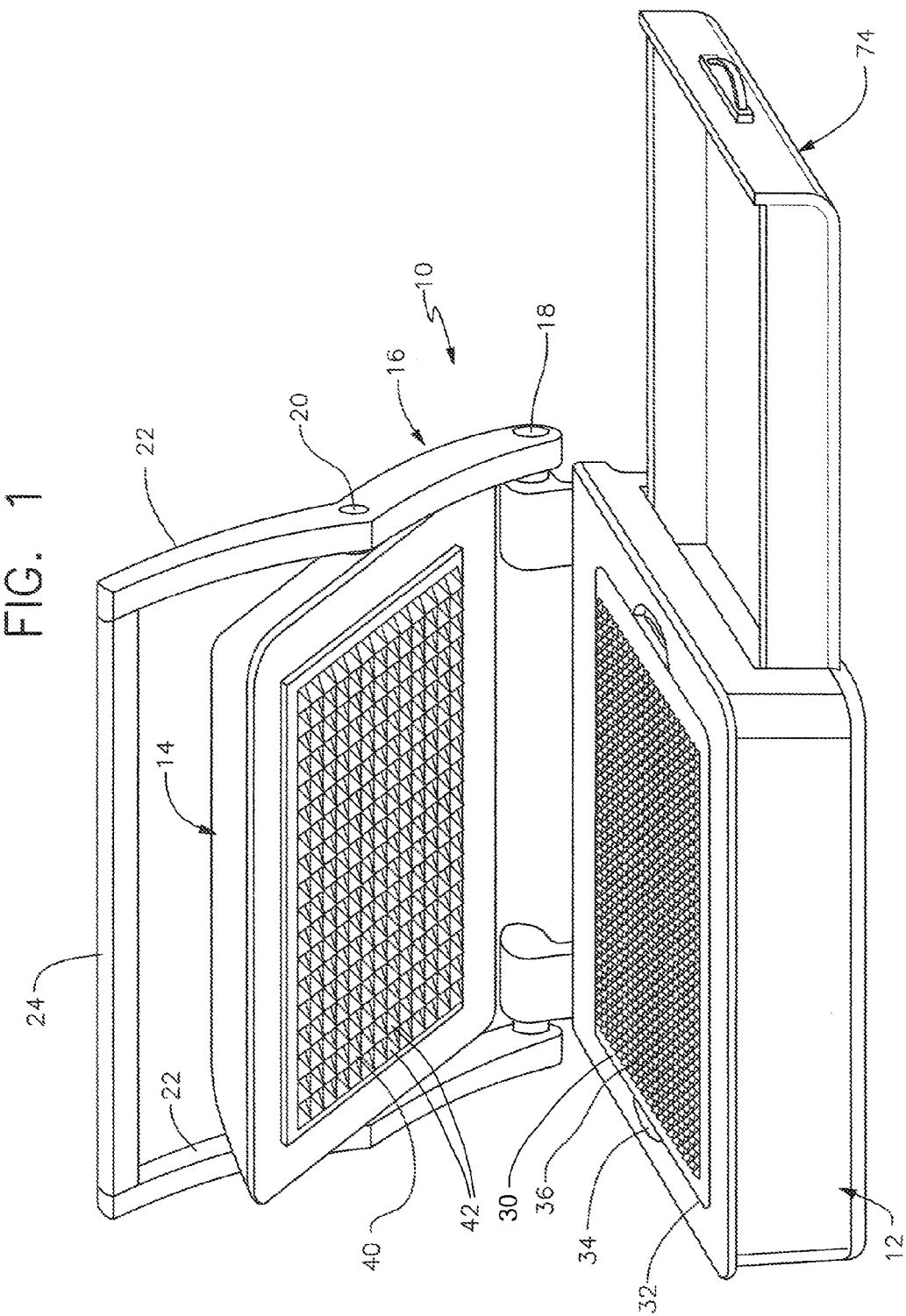
FIG. 1 is a perspective view of the device with the drawer opened.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Figure 2:
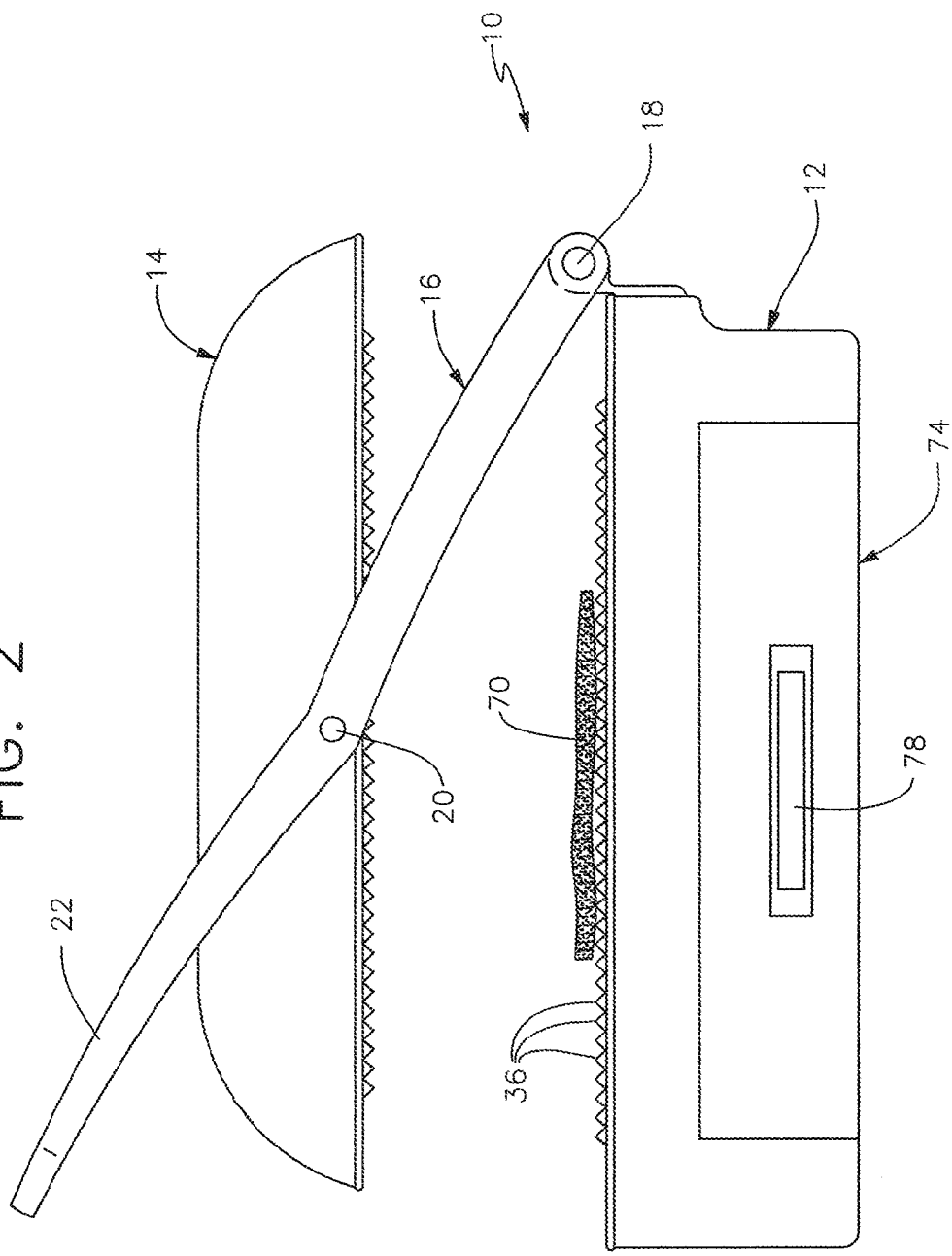
FIG. 2 is a side view of the device opened with food on the plates.
Figure 3:
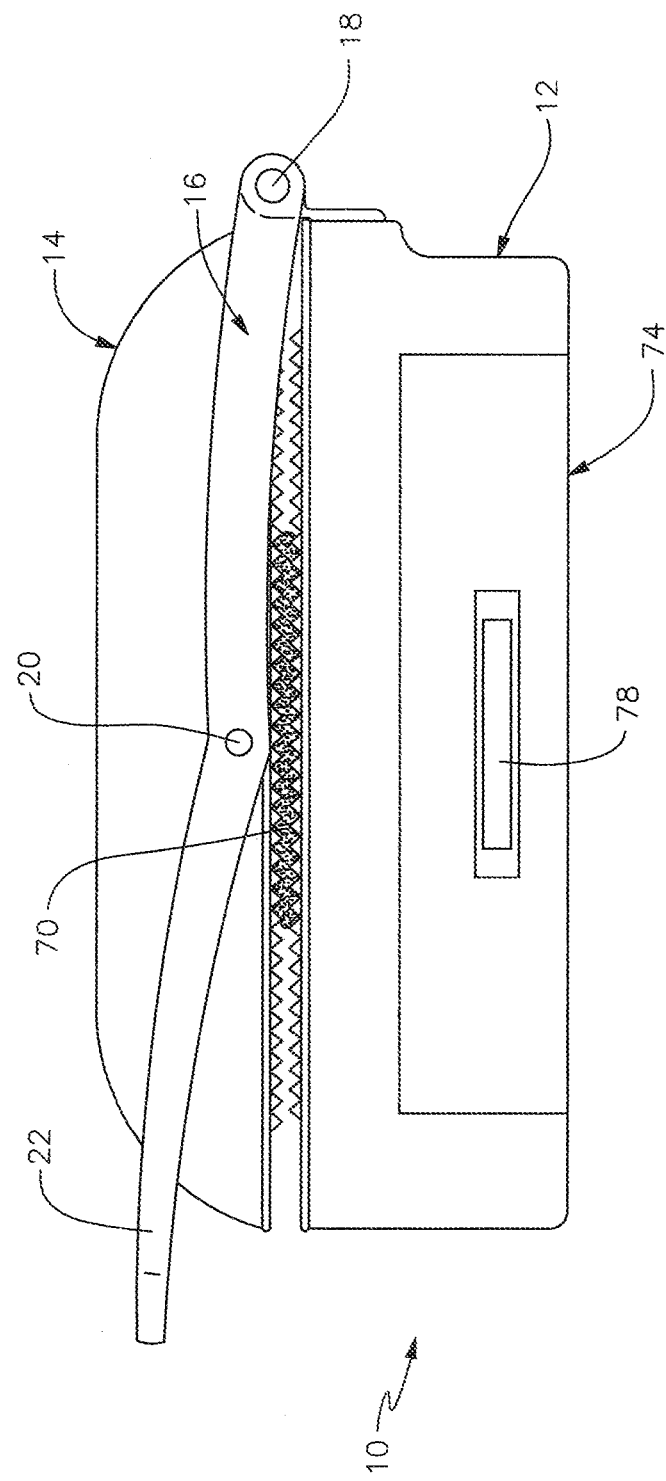
FIG. 3 is a side view as in FIG. 2 with the device closed to tenderizer the food on the plates.

FIG. 1 shows the apparatus 10 which includes a lower support structure 12 and an upper structure 14 connected together by a floating hinge 16. Floating hinge 16 includes hinge points 18 attached to the lower support structure 12 and hinge points 20 attached to the upper structure 14. This allows the upper structure 14 to be raised from the lower support structure 12 and to be lowered and pressed against same as shown in FIGS. 2 and 3. Hinge points 18 and 20 are connected to an arm 22 which further includes a bar handle 24.

For tenderizing meats and the like, a lower tenderizing plate 30 is placed into lower support structure 12 which preferably includes a holding recess 32 into which it may be readily positioned and finger holes 34 to make it easier to remove plate 30. Tenderizing plate 30 has a plurality of pyramid-like spikes 36 extending upwardly as shown in FIGS. 1-3.

Upper structure 14 has a tenderizing plate 40 similar to plate 30 and includes pyramid-like spikes 42. Plate 40 may be held in place by friction or a catch that allows it to be readily removed. As shown, spikes 42 are larger than spikes 36.

As shown in FIGS. 1-3, if meat is placed on lower tenderizing plate 30 and the bar handle 24 is pulled down, upper tenderizing plate 40 is pulled into position directly above the lower plate such that the spikes will contact and tenderize meat there between. The ability to tenderize meat by simply pulling down on the handle reduces the time to tenderize and marinate all cuts and grades of meat by 85%.

Additionally, the apparatus 10 has the ability to change out tenderizing plates 30, 40 for slicing plates that allows the mechanical advantage and large surface area of the plates to quickly process vegetables, fruits or other food with little effort.

Figure 4:
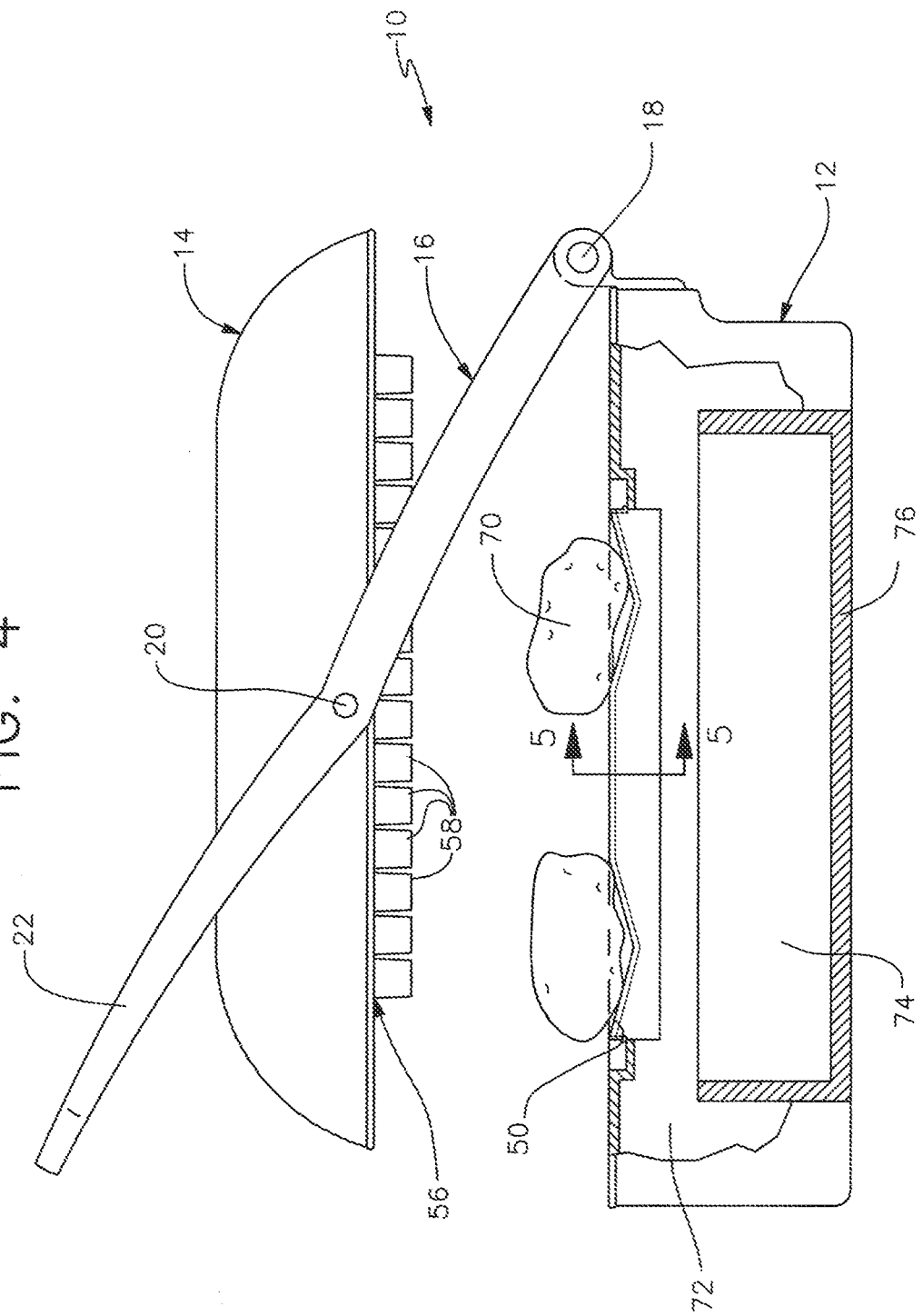
FIG. 4 is a side view of the device opened with slicing plates and food on the plates.
Figure 5:
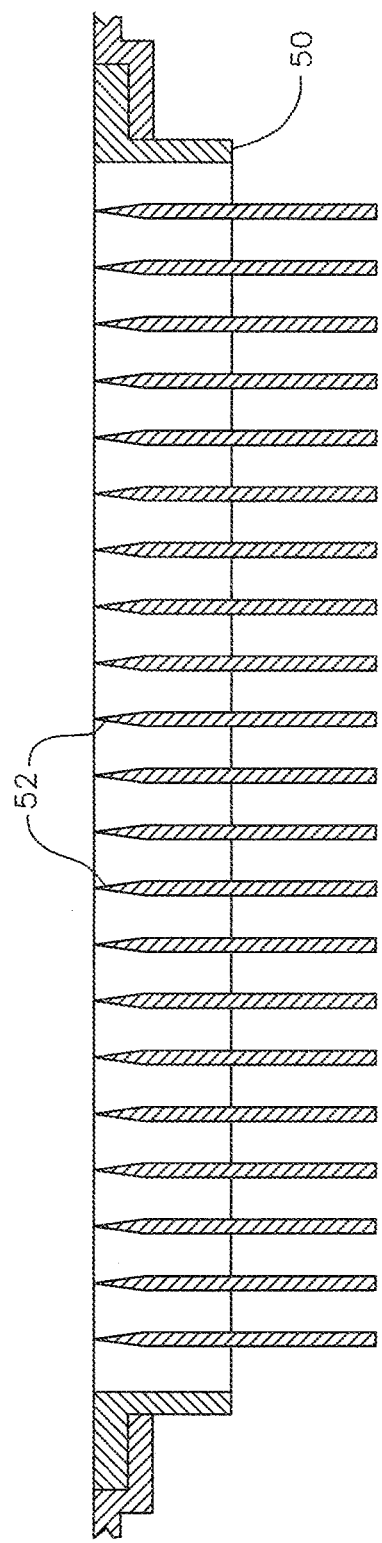
FIG. 5 is a cross-sectional view of the slicing plate of FIG. 4 showing the slicing blades.
Figure 6:
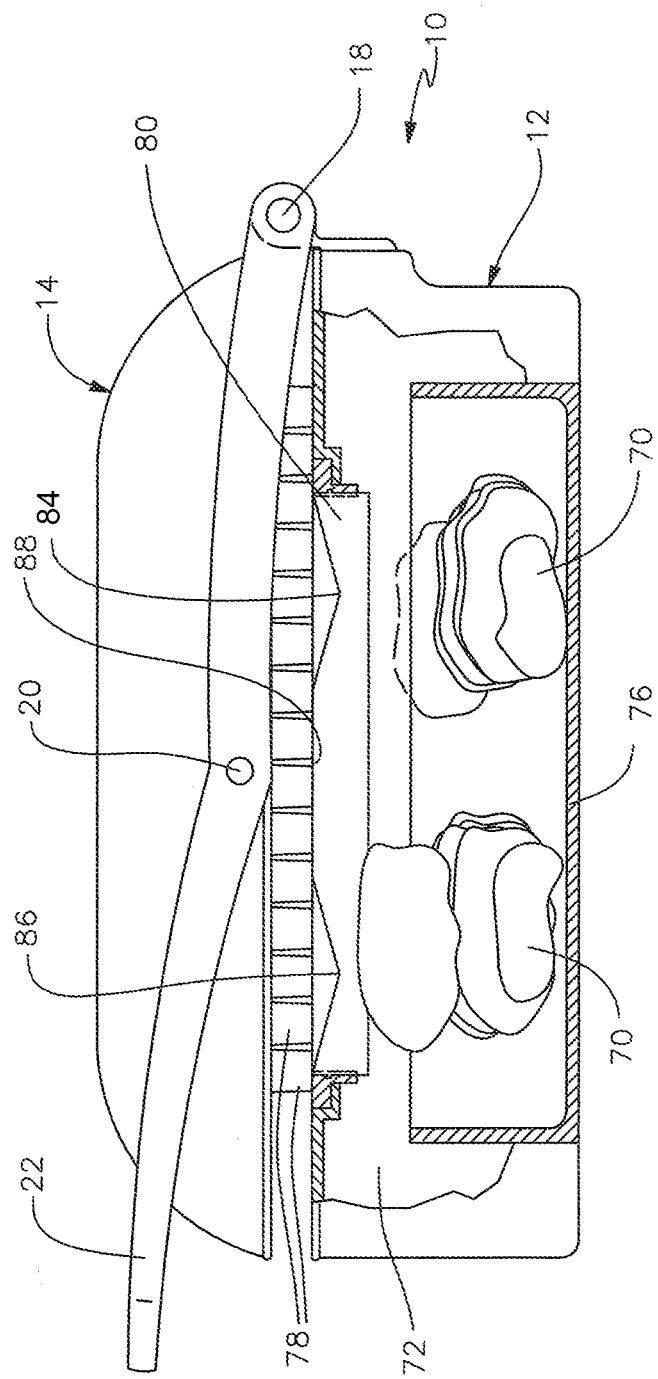
FIG. 6 is a side view of the device of FIG. 4 showing sliced food passing into a lower drawer.

As shown in FIGS. 4-6, lower plate 30 may be removed and a regular line slicing plate 50 may be inserted which has a plurality of cutting blades 52. Upper plate 40 is removed and an upper universal plunger plate 56 is attached which has a plurality of spaced projections 58 in rows such that the spaced projections 58 may be pressed between gaps between the blades 52 and help urge the cut food downwardly. It is possible for the spaced projections 58 to be in rows to slip between the blades 52 as shown and also in rows 90 degrees to the blades in the event that a different blade plate with cutting in both x and y axes is presented. In this case, the spaced projections 58 may be lined up arrays of downwardly projecting cubes as shown. Cut food 70 passes through blades 52 and into a chamber 72 within lower support structure 12. Preferably, lower support structure 12 includes a drawer 74 into which cut food 70 may fall and be readily removed by pulling the drawer 74 from the chamber 72. While shown with side walls in FIG. 1, the drawer 74 may simply have a bottom 76 and a handle 78 as shown. In this configuration, drawer 74 may also be configured as a cutting board. Drawer 74 makes it easier to clean the apparatus 12. As shown, the greater depth to the chamber 72 could be used to store plates that are not in use.

Figure 7:
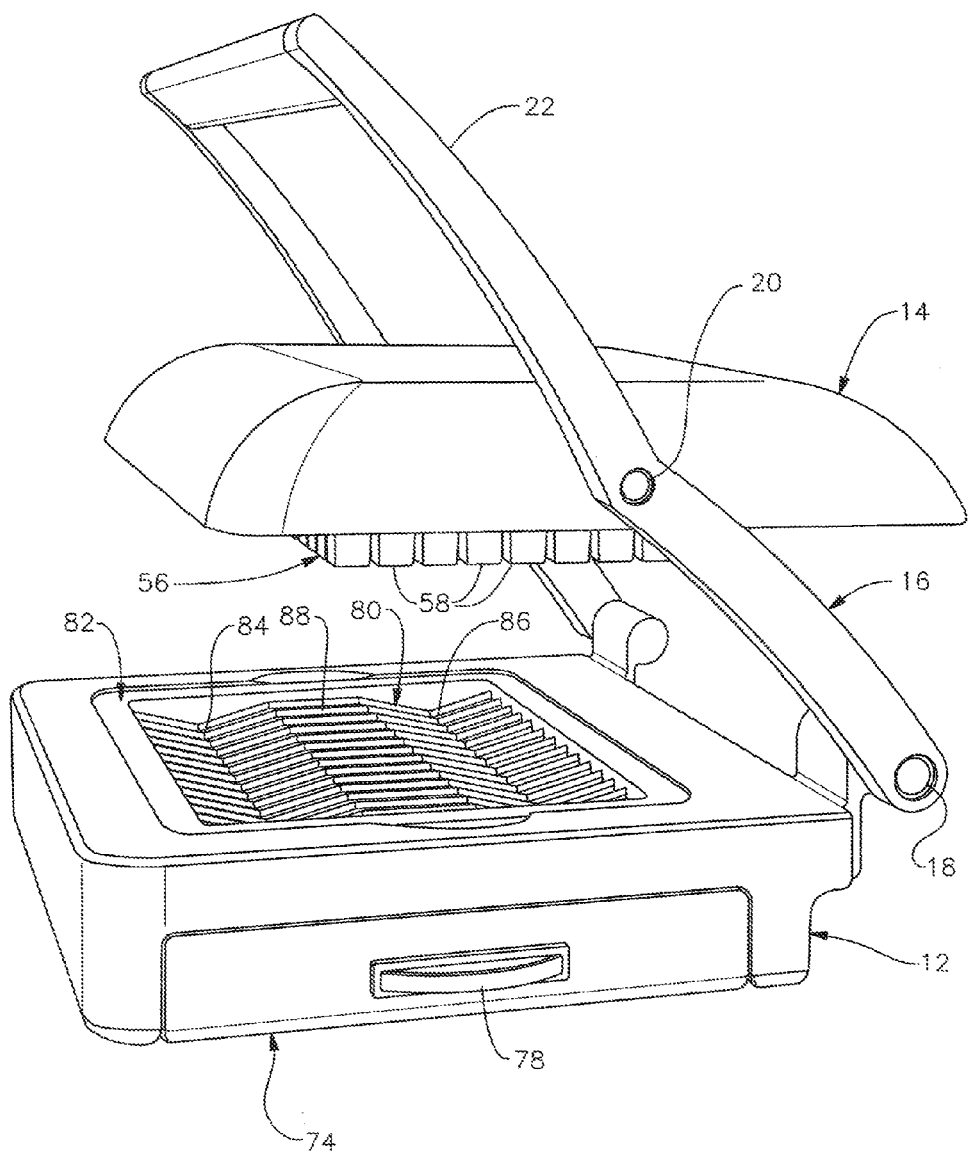
FIG. 7 is a side perspective view of the apparatus with a W-shape slicing plate.

Additional slicing plate designs could be used. For example, FIG. 7 shows W-shaped slicing blades 80 in W-shaped slicing plate 82. The W-shaped slicing blades have two lower regions 84, 86 into which food that may tend to roll may be placed to hold their position. As shown, the W-shape can have a central flattened region 88 as well.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A food preparation apparatus comprising:
(a) a lower support structure;
(b) an upper structure, said upper structure and lower support structure being interconnected with a floating hinge;
(c) said floating hinge being connected to a handle which may be depressed to cause the upper structure to lower to contact the lower support structure;
(d) said lower support structure including a removable tenderizing plate including a plurality of upwardly projecting pyramidal spikes;
(e) said upper structure including a removable tenderizing plate including a plurality of downwardly projecting pyramidal spikes, said plates being constructed and arranged to substantially come in contact with each other such that each plate's spikes are directed toward the other when the handle closes said apparatus.

2. A food preparation apparatus comprising:
(a) a lower support structure;
(b) an upper structure, said upper structure and lower support structure being interconnected with a floating hinge;
(c) said floating hinge being connected to a handle which may be depressed to cause the upper structure to lower to contact the lower support structure;
(d) said lower support structure including a tenderizing plate including a plurality of upwardly projecting spikes;
(e) said upper structure including a tenderizing plate including a plurality of downwardly projecting spikes, said plates being constructed and arranged to substantially come in contact with each other such that each plate's spikes are directed toward the other when the handle closes said apparatus;
wherein said tenderizing plates are removable and further including a lower slicing plate held in said lower support structure and including a plurality of slicing blades.

3. The food preparation apparatus of claim 2 further including a universal plunging plate held to said upper structure and including a plurality of spaced projections arranged to pass between the slicing blades of said lower slicing plate to help push food through said slicing plate.

4. The food preparation apparatus of claim 2 wherein said lower slicing plate includes a plurality of slicing blades which include at least two lower valleys such that each blade is W-shaped.

5. The food preparation apparatus of claim 2 further including a drawer within said lower support structure including a drawer bottom and a handle for removing the drawer.

6. A food preparation apparatus comprising:
(a) a lower support structure;
(b) an upper structure, said upper structure and lower support structure being interconnected with a floating hinge;
(c) said floating hinge being connected to a handle which may be depressed to cause the upper structure to lower to contact the lower support structure;
(d) said lower support structure including a tenderizing plate including a plurality of upwardly projecting spikes;
(e) said upper structure including a tenderizing plate including a plurality of downwardly projecting spikes, said plates being constructed and arranged to substantially come in contact with each other such that each plate's spikes are directed toward the other when the handle closes said apparatus; further including a drawer within said lower support structure including a drawer bottom and a handle for removing the drawer.

7. A food preparation apparatus comprising:
(a) a lower support structure;
(b) an upper structure, said upper structure and lower support structure being interconnected with a floating hinge;
(c) said floating hinge being connected to a handle which may be depressed to cause the upper structure to lower to contact the lower support structure;
(d) said lower support structure including a slicing plate including a plurality of spaced slicing blades;
(e) said upper structure including a universal plunger plate including a plurality of spaced projections extending downwardly and being spaced to extend between said slicing blades so as to push food on said slicing plate there through, said plates being constructed and arranged to substantially come in contact with each other such that each plates are directed toward the other when the handle closes said apparatus.

\* \* \* \* \*